United States Patent [19]

Bean

[11] Patent Number: 5,524,147
[45] Date of Patent: Jun. 4, 1996

[54] METHOD FOR FORMING A VIRTUAL CALL CENTER

[75] Inventor: Timothy E. Bean, Pleasanton, Calif.

[73] Assignee: Aspect Telecommunications Corporation, San Jose, Calif.

[21] Appl. No.: 383,022

[22] Filed: Feb. 2, 1995

[51] Int. Cl.⁶ .................................................. H04Q 3/64
[52] U.S. Cl. .......................... 379/265; 379/211; 379/212; 379/221; 379/266; 379/309
[58] Field of Search ..................................... 379/265, 266, 379/221, 309, 244, 211, 112, 212; 370/58.2

[56] References Cited

U.S. PATENT DOCUMENTS

| | | | |
|---|---|---|---|
| 3,692,948 | 9/1972 | Warner | 379/266 |
| 3,692,950 | 9/1972 | Lecoanet et al. | 379/266 |
| 3,887,902 | 6/1975 | Labalme | 379/266 |
| 3,969,589 | 7/1976 | Meise, Jr. et al. | 379/266 |
| 4,048,452 | 9/1977 | Oehring et al. | 379/113 |
| 4,400,587 | 8/1983 | Taylor et al. | 379/266 |
| 4,497,979 | 2/1985 | Phelan | 379/266 |
| 4,510,351 | 4/1985 | Costello et al. | 379/112 |
| 4,737,983 | 4/1988 | Frauenthal et al. | 379/221 |
| 4,757,529 | 7/1988 | Glapa et al. | 379/244 |
| 4,788,715 | 11/1988 | Lee | 379/266 |
| 4,858,120 | 8/1989 | Samuelson | 379/309 |
| 4,893,301 | 1/1990 | Andrews et al. | 370/58.2 |
| 4,922,519 | 5/1990 | Daudelin | 379/266 |
| 4,953,204 | 8/1990 | Cuschleg, Jr. et al. | 379/309 |
| 5,073,890 | 12/1991 | Danielsen | 370/58.2 |
| 5,185,782 | 2/1993 | Srinivasan | 379/266 |
| 5,241,584 | 8/1993 | Hardy et al. | 379/266 |
| 5,278,898 | 1/1994 | Cambray et al. | 379/266 |
| 5,291,552 | 3/1994 | Kerrigan et al. | 379/266 |
| 5,299,259 | 3/1994 | Otto | 379/221 |
| 5,309,513 | 5/1994 | Rose | 379/265 |
| 5,335,269 | 8/1994 | Steinlicht | 379/309 |
| 5,369,695 | 11/1994 | Chakravarti et al. | 379/211 |
| 5,384,841 | 1/1995 | Adams et al. | 379/309 |

Primary Examiner—Jeffery Hofsass
Assistant Examiner—Scott Wolinsky
Attorney, Agent, or Firm—Townsend and Townsend and Crew; Kenneth R. Allen

[57] ABSTRACT

A virtual call center is formed by use of real-time insertion of call-listing requests of new phone calls into existing calls-waiting lists of several ACDs according to time information such as the global age of the calls. Each ACD normally lists the calls by the local age, so the inserted requests can receive priority over calls listed only locally. A network of connected ACDs allows the calls to be answered by any available service agent in the order in which the phone calls were received by any ACD anywhere in the network of connected ACDs.

6 Claims, 3 Drawing Sheets

METHOD FOR FORMING A VIRTUAL CALL CENTER

BACKGROUND OF THE INVENTION

This invention relates to methods for handling calls to Automated Call Distributors (ACDs). An ACD is a telephone switch typically manned by hundreds of agents, e.g. an airline reservation center to connects agents to phone calls.

In a conventional ACD, phone calls are processed on a first-in, first-out basis: the longest call waiting is answered by the next available agent. Answering calls across multiple automated call distributors (ACD) is typically done on a first-in, first-out basis dependent upon time of receipt of the call by each ACD, whether the call is directly connected or forwarded.

U.S. Pat. No. 4,893,301 is an example of use of a multiple line interface modules with remote line interface connectivity to a PCM bus. Specifically, it discloses use of a portion of an ACD at a remote location from a call center which are connected together via a T-1 connection to perform centralized call processing. This is an example of a single ACD with remote input and processing rather than a network of multiple ACDs forming a virtual call center. In the invention described in this patent, it is possible to process calls at the single ACD on a first-in first-out basis.

A search of U.S. Patent and Trademark Office records also uncovered the following references:

U.S. Pat. No. 4,048,452 discloses an ACD where the time in queue for each call is measured and compared against upper and lower time thresholds. When time in queue exceeds an upper threshold, the call is re-directed, provided that the measured time in alternative queue for the oldest call is less than the threshold.

U.S. Pat. No. 4,737,983 discloses an ACD with a database with a pointer maintained to the next entry in a table to be initially selected in response to a next call routing query. Tests may be performed to determine if call should actually be routed to the selected ACD.

U.S. Pat. No. 4,757,529 discloses an ACD creating a separate queue for each call type, detecting when a terminal becomes available, and distributing waiting calls from different queues to servers in accordance with defined priority values.

U.S. Pat. No. 5,073,890 discloses an automatic call distributor for providing ACD service from remote ACD agents.

U.S. Pat. No. 5,278,898 discloses a system for managing a hold queue.

U.S. Pat. No. 5,309,513 discloses a telephone system comprising a plurality of automatic call distributors for receiving and distributing calls in a sequential order.

U.S. Pat. No. 5,369,695 discloses a facility for redirecting a call from one destination point to another, in which event a new timer value could be same as or different from prior timer value.

SUMMARY OF THE INVENTION

According to the invention, a virtual call center is formed by use of real-time insertion of call-listing requests of new phone calls into existing calls-waiting lists of several interconnected Automated Call Distributors (ACDs) according to time information such as the global age of the calls. Each ACD normally lists the calls by the local age, so the inserted requests can receive priority over calls listed only locally. A network of connected ACDs allows the calls to be answered by any available service agent in the order in which the phone calls were received by any ACD anywhere in the network of connected ACDs. In a preferred embodiment, the ACDs communicate, among other information, a fixed difference time or recorded age indicative of the length of time between timeout time and call start to be used by the receiving ACD to determine position of insertion in its own calls-waiting list.

The invention will be better understood upon reference to the following detailed description in conjunction with the accompanying drawings.

DESCRIPTION OF THE PREFERRED EMBODIMENT

Figure 1:
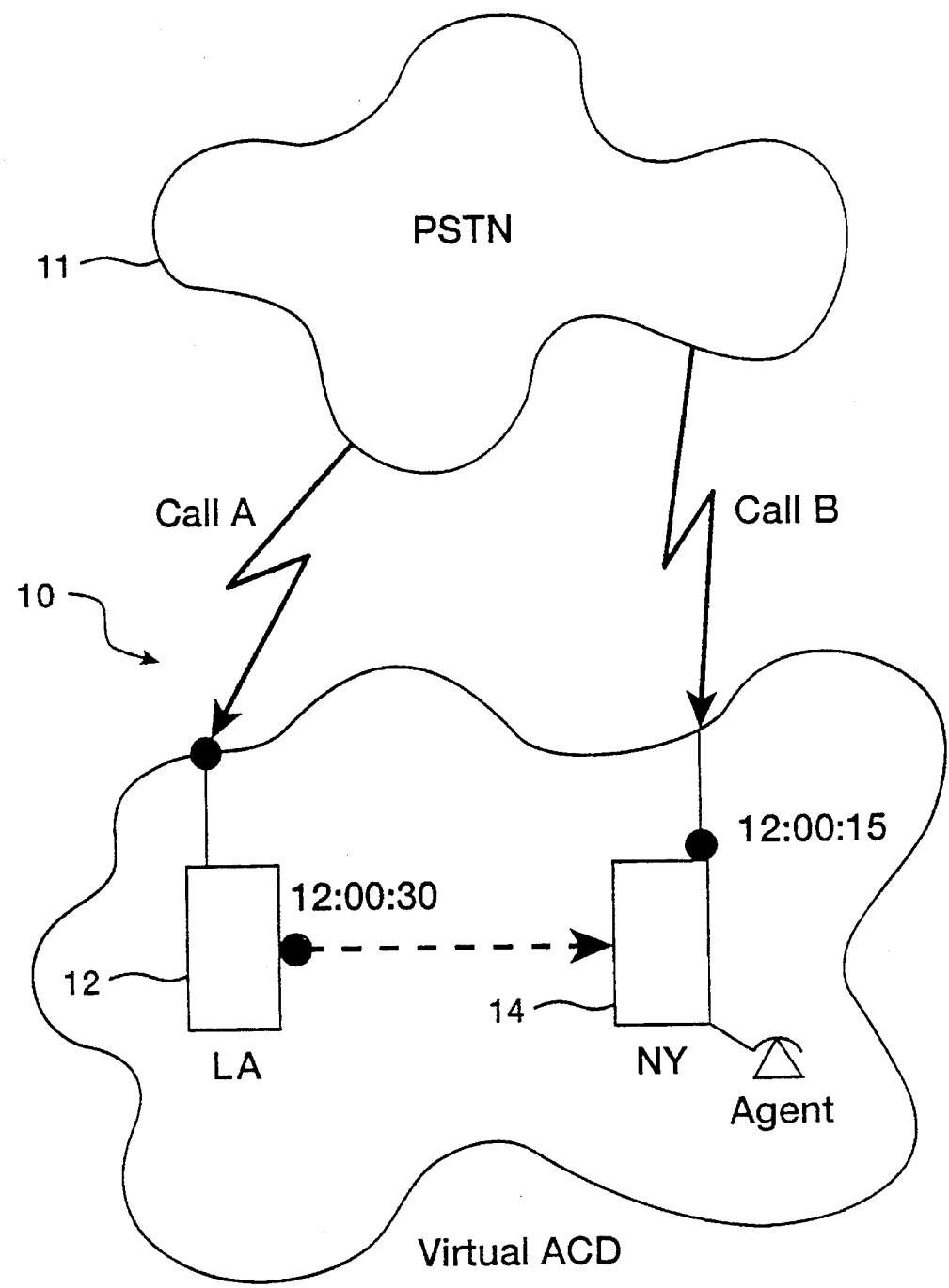
FIG. 1 is a diagram illustrating an example of connections between ACDs according to the invention.

The invention is best illustrated by a simple case of a network 10 (FIG. 1) of two Automated Call Distributors (ACDs), e.g., one being in Los Angeles 12, the other being in New York 14. Each has hundreds of phone calls from a publicly switched telephone network (PSTN) 11 waiting to be answered. According to the invention, the longest call then waiting in Los Angeles or New York is answered by the next available agent in either Los Angeles or New York. Thus, the Los Angeles and the New York Automated Call Distributors appear as a single virtual mechanism for the longest call waiting to be answered by the next available agent anywhere. To do this, first, one ACD then other ACDs queue the call by the caller's waiting time.

Consider the following example:

A telephone call (Call A) arrives in the Los Angeles ACD, such as a reservations center, at 12:00:00 Noon EST. Assuming there are already 100 calls waiting for agents, Call A goes to the end of the calls-waiting list as the 101st call in Los Angeles. Call A waits for 30 seconds at the Los Angeles center 12. If at 12:00:30 EST, Call A has still not been handled by an agent, the Los Angeles ACD 12 then notifies the New York ACD 14 about Call A at 12:00:30 PM EST. If there are already 200 calls waiting for agents in New York, Call A in the past normally would wait for the next available agent in New York as the 201st call in New York.

According to the invention, Call A is placed on the calls-waiting list in New York as if it were received in New York at 12:00:00 PM EST. Since Call A has been waiting for 30 seconds in Los Angeles, it is not treated as the 201st call in New York, but rather it is inserted in the calls-waiting list in New York ahead of all the other calls in New York (of the same importance or "priority") which arrived after 12:00:00 Noon EST. Another Call B received in New York at 12:00:15 EST is thus queued after Call A.

The unique capability to dynamically insert and order the call-waiting list by time in a real-time telephony environment across multiple systems allows for the longest call waiting to be answered by the first available agent.

Figure 2:
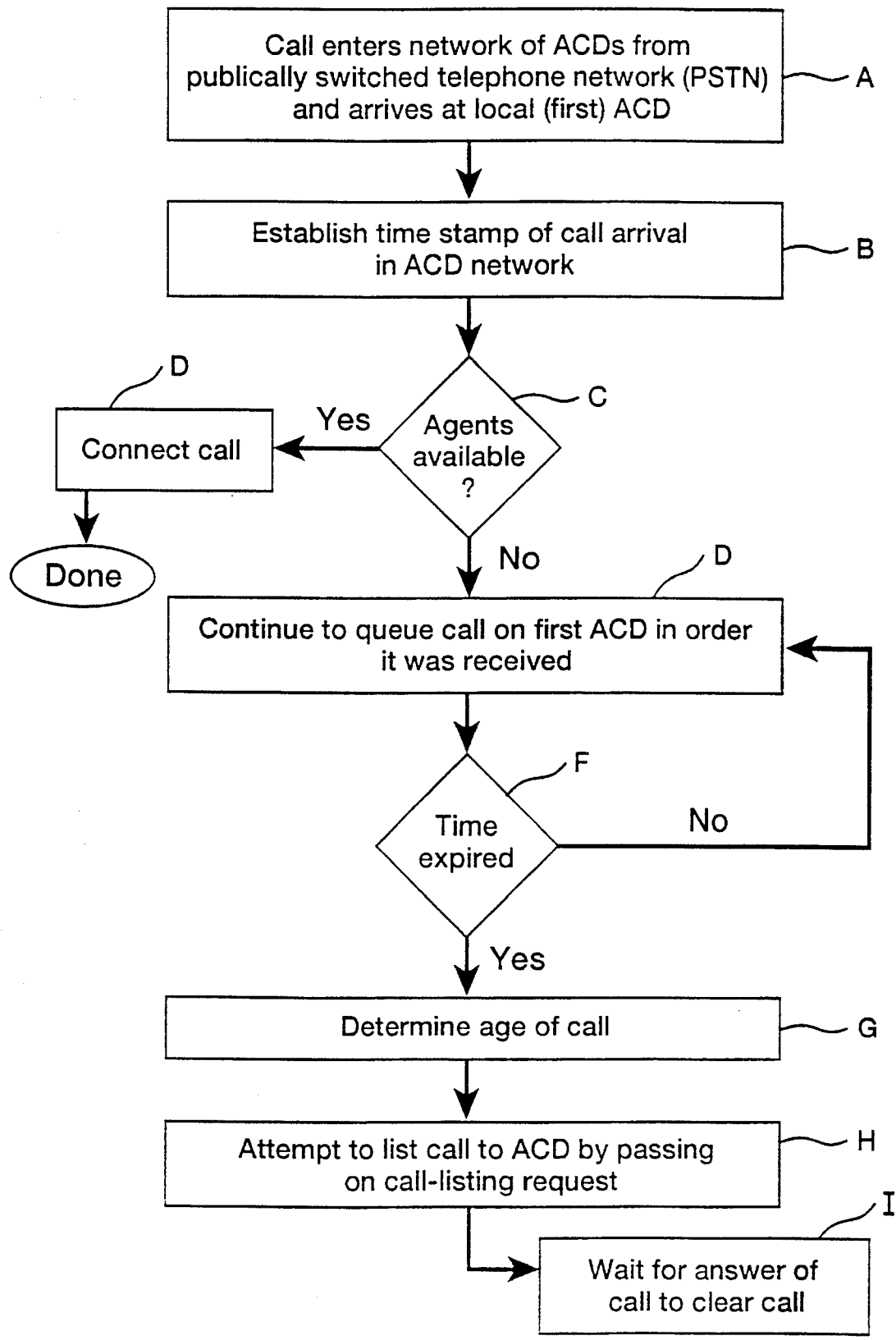
FIG. 2 is a flow chart for illustrating the method according to the invention on a local or originating ACD.

FIG. 2 is a flow chart of the method for forming a virtual call center in accordance with the invention. It is simply a mechanism for listing all waiting calls among ACDs in a network of ACDs according to the age of the call.

Referring to FIG. 2, calls enter the local ACD from the PSTN (Step A), and a time stamp of call arrival is established for each call (Step B). The local ACD checks for an available agent to field the call (Step C), and if an agent is available which has the needed skill, the call is connected, thus clearing the call from the local calls-waiting list or queue (and any other queue in which the call is listed) (Step D). If not, the call continues in the calls-waiting list on the local ACD (Step E) until a timer expires (Step F).

Once the timer expires, i.e., the timeout period has been exceeded, the local ACD initiates processes to eventually list the call on the calls-waiting list of at least one other ACD in the network, while maintaining the call in its own calls-waiting list.

In this embodiment, the recorded "age" of the call is determined (Step G), then after the recorded "age" of the call is determined, an attempt is made to list the timed-out call on a destination ACD (Step H).

Recorded age can be determined by either the local ACD or the destination ACD. In a particular embodiment, the local ACD determines the recorded age by calculating the length of time the call has waited from the difference between the time stamp of the call on the local calls-waiting list and the current time. In another embodiment, the timeout length is simply used as the recorded age of the call. In still another embodiment, the destination ACD determines the age of the call. The destination ACD receives a listing request for its calls-waiting list from the local ACD, wherein the listing request includes a field containing the time stamp (marking the start of call) of the timed-out call. From that time stamp referenced to a common time reference and the local time also referenced to the same common time reference, the destination ACD calculates the recorded "age" of the call.

(Note that more than one ACD may be receiving calls from the PSTN, which adds a nondeterministic element to the hierarchy of call ranking, which includes age and priority, otherwise complicating the attempt to achieve an ordered listing of calls in a real time telephony involving many ACDs.)

Once the timed-out call has been listed on another ACD, the local ACD waits for the signal indicating the call has been answered before the call is cleared, that is, the call is removed from its own calls-waiting queue (Step I).

Figure 3:
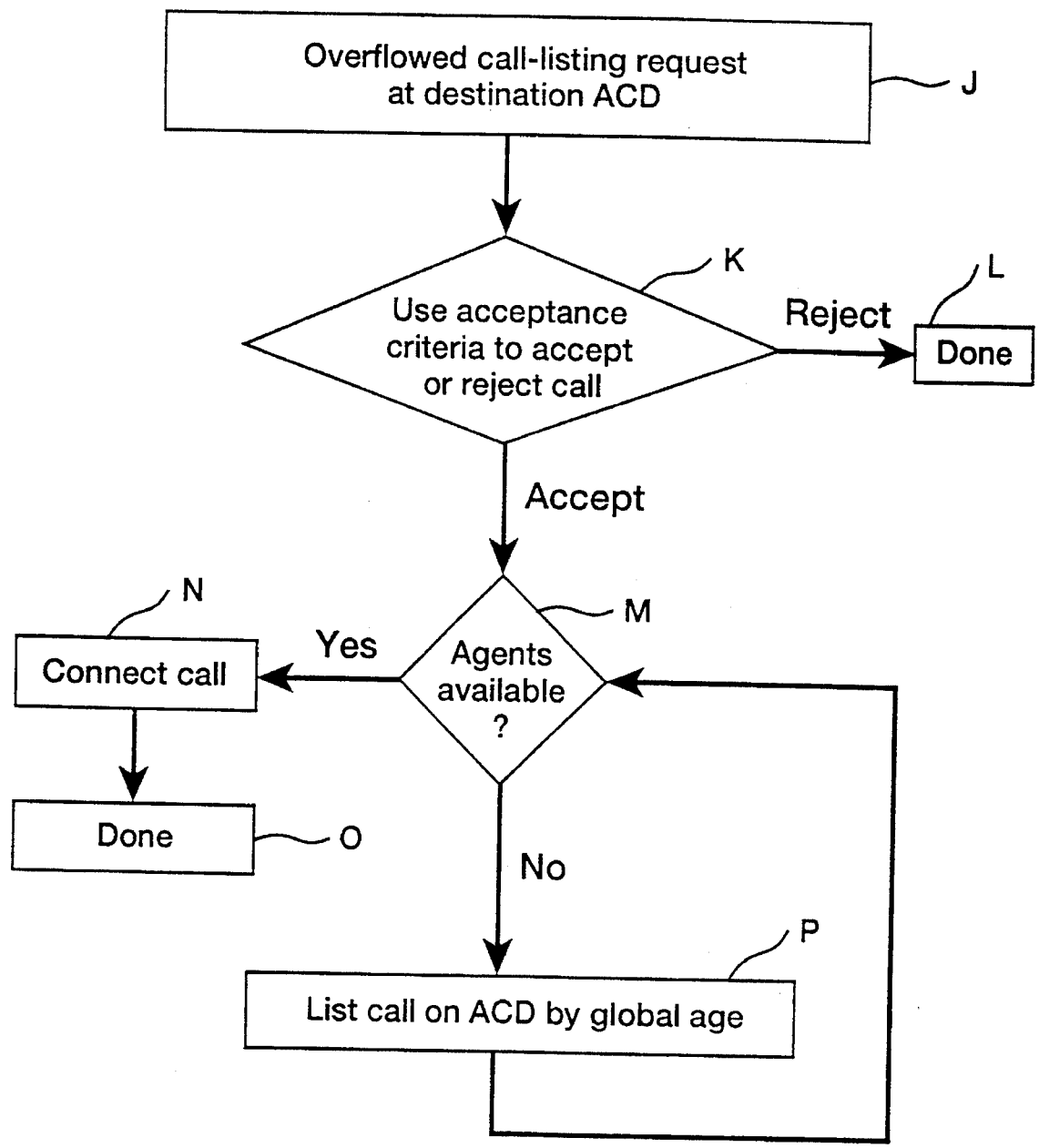
FIG. 3 is a flow chart for illustrating a portion of the method according to the invention on a destination ACD.

Referring to FIG. 3, the destination ACD fields the call listing request of the local ACD (Step J) and applies its own acceptance criteria (Step K). (The acceptance criteria could include number of calls waiting, date and time of day, available and their skills.) If the arriving call does not meet the criteria, it is rejected, and the destination ACD is done (Step L). If the destination ACD accepts the request, it checks for an available agent having the requested skill (Step M). If there is an agent available, the call is immediately connected to the agent via a voice line (Step N) and the destination ACD clears (Step O) the call from its calls waiting list and notifies the other ACD.

If there is no agent available, then according to the invention, the call is listed in the calls-waiting list of the destination ACD at a position determined by the global age, i.e., the age of the call on the network (Step P). Hence, the subject call is listed ahead of other calls received since the subject call was first received from the PSTN. The calls wait on the waiting lists of the various ACD processors until an agent is available or the new timeout period is exceeded, at which time the subject call is treated as if it were any other call, and it is processed according to the method of FIG. 2.

The invention has been explained with reference to specific embodiments. Other embodiments will be apparent to those of ordinary skill in the art. It is therefore not intended that this invention be limited, except as indicated by the appended claims.

What is claimed is:

1. A method for forming a virtual call center in a network of automated call distributors (ACDs) such that service agents at different real call centers can field phone calls as if in a single call center, each of said ACDs maintaining a calls-waiting list for routing pending phone calls to local service agents, said method comprising the steps of:

receiving new phone calls at a first ACD anywhere in said network;

establishing a time stamp for each of said new phone calls at said first ACD;

after a predetermined timeout period following the receipt of each call, issuing a call-listing request for each call to a next ACD in said network, establishing time information for each call and passing said time information to said next ACD; and inserting each call-listing request at a selected position in the calls-waiting list of said next ACD ahead of some pending phone calls in said calls-waiting list of said next ACD, said selected position being a ranking based on said time information and independent of time of occurrence of said issuing step, such that each call received at said first ACD can be answered ahead of some pending calls at said next ACD.

2. The method according to claim 1 wherein said time stamp is referenced to a common time reference and wherein said time information includes the global age of each call.

3. The method according to claim 1, further including the step of delisting a call at said first ACD only after a connection is made with the call at any next ACD anywhere in the network.

4. The method according to claim 1 wherein said time stamp is referenced to a local time reference and wherein said time information is a fixed timeout length assigned to each call.

5. The method according to claim 1 wherein said time stamp is referenced to a local time and said time information is a recorded age of said call from the time of said receiving step to the time of said issuing step.

6. The method according to claim 5 wherein said inserting step at said next ACD comprises:

assigning each call a local time stamp, each local time stamp comprising the time of occurrence of each corresponding call-listing request rolled back by said recorded age, and placing each call in time stamp order in said calls-waiting list.

\* \* \* \* \*